United States Patent
Ikeda

(10) Patent No.: US 7,551,194 B2
(45) Date of Patent: Jun. 23, 2009

(54) OPTICAL WRITING DEVICE, IMAGE FORMING DEVICE, AND OPTICAL WRITING METHOD

(75) Inventor: Yoshito Ikeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 505 days.

(21) Appl. No.: 11/466,672

(22) Filed: Aug. 23, 2006

(65) Prior Publication Data

US 2007/0047022 A1    Mar. 1, 2007

(30) Foreign Application Priority Data

Aug. 24, 2005   (JP)   ............... 2005-243084

(51) Int. Cl.
 *B41J 2/435* (2006.01)
(52) U.S. Cl. ..................................... 347/249
(58) Field of Classification Search .............. 347/144, 347/145, 229, 234, 235, 247–250, 254; 358/448
See application file for complete search history.

(56) References Cited

U.S. PATENT DOCUMENTS

| | | | | |
|---|---|---|---|---|
| 4,717,925 A | * | 1/1988 | Shibata et al. | ............... 347/250 |
| 5,117,243 A | * | 5/1992 | Swanberg et al. | ............ 347/254 |
| 5,933,184 A | * | 8/1999 | Ishigami et al. | .............. 347/249 |
| 7,129,967 B2 | * | 10/2006 | Seki et al. | .................... 347/249 |
| 7,170,544 B2 | * | 1/2007 | Horiuchi | ...................... 347/247 |
| 7,327,379 B2 | * | 2/2008 | Nihei et al. | .................. 347/247 |
| 7,460,159 B2 | * | 12/2008 | Ohkawara et al. | ......... 348/222.1 |
| 2001/0022671 A1 | * | 9/2001 | Itoh | ........................... 358/448 |

FOREIGN PATENT DOCUMENTS

| | | |
|---|---|---|
| JP | 2001-51214 | 2/2001 |
| JP | 3386203 | 1/2003 |
| JP | 2003-34051 | 2/2003 |
| JP | 2003-211723 | 7/2003 |

OTHER PUBLICATIONS

Masaaki Ishida, et al., "Electrical Dot Position Compensation in Main Scanning Direction of Laser Scanning Optical System", Ricoh Technical Report No. 30, Dec. 2004, pp. 78-83.

* cited by examiner

*Primary Examiner*—Hai C Pham
(74) *Attorney, Agent, or Firm*—Oblon, Spivak, McClelland, Maier & Neustadt, P.C.

(57) ABSTRACT

An optical writing device includes a scanning unit that scans an optical beam in a main scanning direction while shifting a scanning position in a sub-scanning direction by a predetermined pitch, a clock frequency changing unit that changes a frequency of a write clock at a position in the main scanning direction, an image data processing unit that processes image data according to change in the frequency of the write clock, and a correcting unit that adds, when a pixel is removed from the image data, removed pixel to pixels corresponding to the next write clock.

19 Claims, 12 Drawing Sheets

OPTICAL WRITING DEVICE, IMAGE FORMING DEVICE, AND OPTICAL WRITING METHOD

CROSS-REFERENCE TO RELATED APPLICATIONS

The present document incorporates by reference the entire contents of Japanese priority document, 2005-243084 filed in Japan on Aug. 24, 2005.

BACKGROUND OF THE INVENTION

1. Field of the Invention

The present invention relates to an optical writing device, an image forming device including the optical writing device, and an optical writing method.

2. Description of the Related Art

As examples of conventional technologies for writing data with an optical beam are cited what are disclosed in Japanese Patent Application Laid-Open No. 2003-034051 and Japanese Patent Application Laid-Open No. 2001-051214. Japanese Patent Application Laid-Open No. 2003-034051 discloses a technology for correcting the scanning irregularity caused by a scanning lens or the like. According to the technology, a count value of a high-frequency clock with a frequency higher than that of a pixel clock is compared with data on the phase-shift amount of a pixel clock per unit of the high-frequency clock. The phase-shift amount data is used to correct the displacement of the write starting position in a scanning direction due to scanning distance variations from the rotation axis of a reflecting surface of a deflector or displaced luminous points of light fluxes in the scanning direction. Based on the comparison result, at least one of the rising edge and the falling edge of the pixel clock is phase-shift controlled.

Japanese Patent Application Laid-Open No. 2001-051214 discloses a technology for correcting magnification error of an image in a main scanning direction with a simple configuration. In the technology, a temperature sensor detects a temperature of an f-theta lens, and correction data corresponding to the detected temperature is read from a correction amount storage section. A write clock generating section generates a write clock frequency for the correction data. With the write clock frequency, the magnification of the image is changed in the main scanning direction. After the temperature of the f-theta lens is detected and the write clock frequency is corrected, the total magnification of the image is adjusted on a drum.

In addition, Ricoh Technical Report No. 30, December, 2004 discloses operations for expanding and contracting a pixel clock.

In an electrophotographic image forming device such as a digital copier including an optical writing device, even intervals of laser beams as an image forming medium on a photosensitive drum are maintained by the f-theta lens. Recently, a material of the f-theta lens is switched from glass to plastic to reduce costs. However, the plastic f-theta lens may be affected by heat generated in the device. Namely, as the temperature in the device is getting increased, the plastic f-theta lens becomes to expand by the heat. As a result, it may fail to perform the laser beam writing in an exact position on the photosensitive drum. The f-theta lens has the magnification deviation in the main scanning direction so that widths of any areas in the main scanning direction are not equal.

For example, the technology disclosed in Japanese Patent Application Laid-Open No. 2003-034051 is known as the one for solving the problem. In the technology, a position correction in the main scanning direction is performed by expanding and contracting a write clock frequency (CLK) singly and changing the width of the write CLK in any main scanning position of the image, and a laser writing position is adjusted to the target position. When a write starting position of the image is to be shifted to the back-end side of the main scanning position, the width of the write CLK at any position is expanded, and the following main scanning position is also shifted by the expanded distance. By repeating the operation, a laser beam can illuminate anywhere the image is to be formed. Furthermore, the magnification deviation of the f-theta lens is cancelled by expanding and contracting the width of the write CLK based on the deviation in each area.

However, according to the technologies described above, when the CLK is expanded and contracted, a laser beam (pixel concentration information) generated in the CLK is also expanded and contracted. In a color copier, particularly, a color image is formed by a combination of YMC (yellow, magenta, and cyan) colors, and therefore, a color of a portion where the CLK is expanded and contracted differs from that of a portion where the CLK is not expanded and contracted. The color differences may be regarded as image degradation.

SUMMARY OF THE INVENTION

It is an object of the present invention to at least partially solve the problems in the conventional technology.

According to an aspect of the present invention, an optical writing device includes a scanning unit that scans an optical beam in a main scanning direction while shifting a scanning position in a sub-scanning direction by a predetermined pitch to write pixels on a recording medium, a clock frequency changing unit that changes a frequency of a first write clock for writing data by the scanning unit from a first frequency to a second frequency at a position in the main scanning direction, an image data processing unit that processes first image data to be written to the position according to the second frequency thereby obtaining second image data, and a correcting unit that adds, when a pixel is removed from the first image data when obtaining the second image data in the image data processing unit, removed pixel to pixels corresponding to a second write clock that follows the first write clock.

According to another aspect of the present invention, an image forming device includes the above optical writing device.

According to still another aspect of the present invention, an optical writing method includes scanning an optical beam in a main scanning direction while shifting a scanning position in a sub-scanning direction by a predetermined pitch to write pixels on a recording medium, detecting a reference position to start writing in the main scanning direction to generate a detection signal, determining a write starting position in the main scanning direction based on the detection signal, changing a frequency of a first write clock for writing data from a first frequency to a second frequency at a position in an area scanned from the write starting position in the main scanning direction, and adding, when a pixel is removed from the first image data, removed pixel to pixels corresponding to a second write clock that follows the first write clock.

According to still another aspect of the present invention, an optical writing device includes scanning means for scanning an optical beam in a main scanning direction while shifting a scanning position in a sub-scanning direction by a predetermined pitch to write pixels on a recording medium, clock frequency changing means for changing a frequency of a first write clock for writing data by the scanning means from a first frequency to a second frequency at a position in the main scanning direction, image data processing means for processing first image data to be written to the position according to the second frequency thereby obtaining second image data, and correcting means for adding, when a pixel is removed from the first image data when obtaining the second image data in the image data processing means, removed pixel to pixels corresponding to a second write clock that follows the first write clock.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Figure 1:
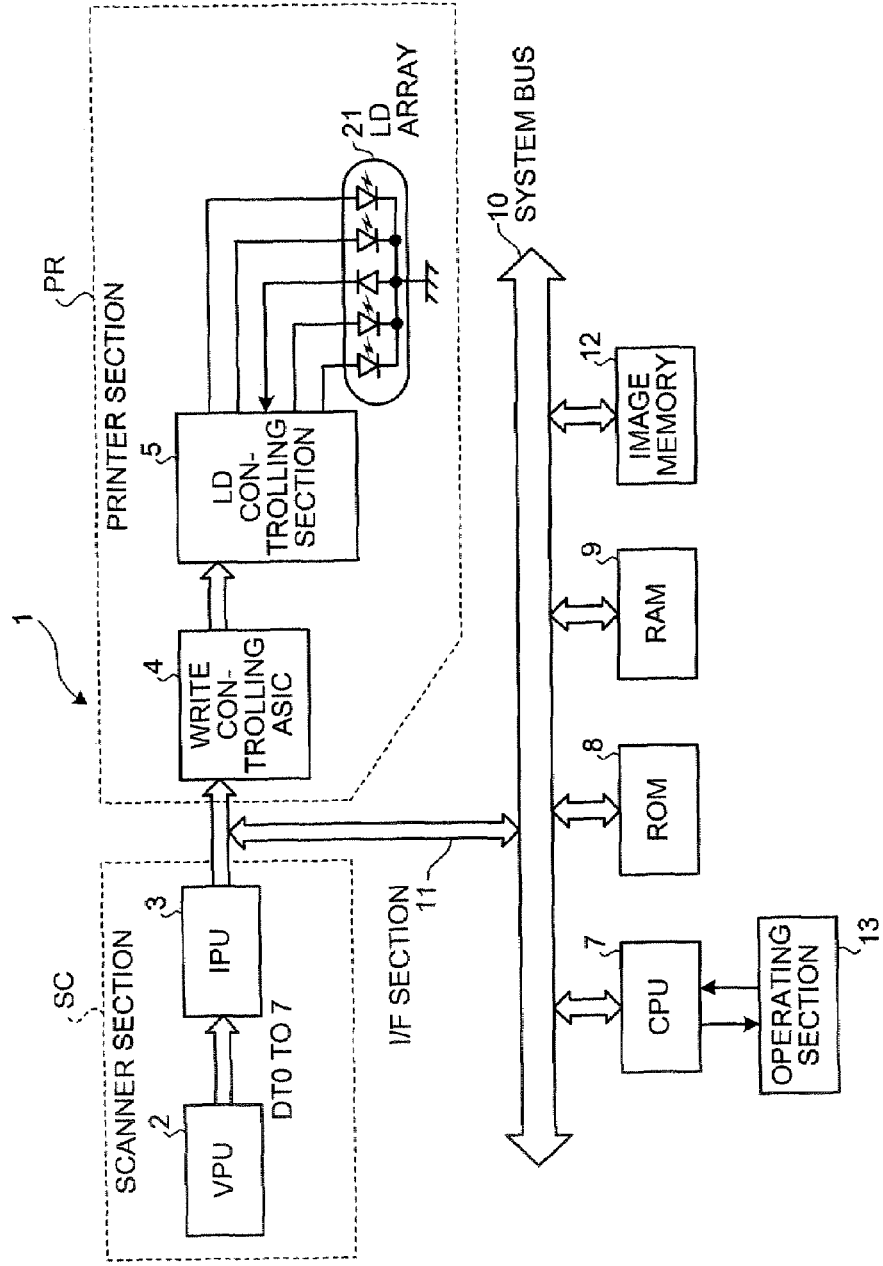
FIG. 1 is a schematic of a digital copier as an image forming device according to an embodiment of the present invention.

FIG. 1 is a schematic of a digital copier 1 as an image forming device according to an embodiment of the present invention. The digital copier 1 includes a scanner section SC that reads image data, a printer section PR, a central processing unit (CPU) 7, a read-only memory (ROM) 8, a random access memory (RAM) 9, and an image memory 12. The CPU 7, the ROM 8, the RAM 9, and the image memory 12 are connected to the scanner section SC and the printer section PR via an internal system bus 10 and an interface (I/F) 11. The scanner section SC includes a visual processing unit (VPU) 2 that performs black offset correction, shading correction, and pixel position correction by converting a read signal from analog to digital, and an instruction processing unit (IPU) 3 that performs image processing. The printer section PR includes a write controlling ASIC 4 that controls the printer section PR, a laser diode (LD) array 21 that optically forms or writes an electrostatic latent image on a photosensitive drum, and a LD controlling section 5 that controls a semiconductor laser beam from the LD array 21.

The CPU 7 controls the entire device. The ROM 8 stores therein a control program executed by the CPU 7. The RAM 9 serves as a work area for the CPU 7, and is used temporarily when the CPU 7 executes the control program. The image memory 12 stores therein information on image data read by the scanner section SC. Data is transmitted and received through the internal system bus 10. The IPU 3 interfaces to the internal system bus 10 via the I/F 11. The CPU 7 connects to an operating section 13 through which a user inputs an instruction.

Figure 2:
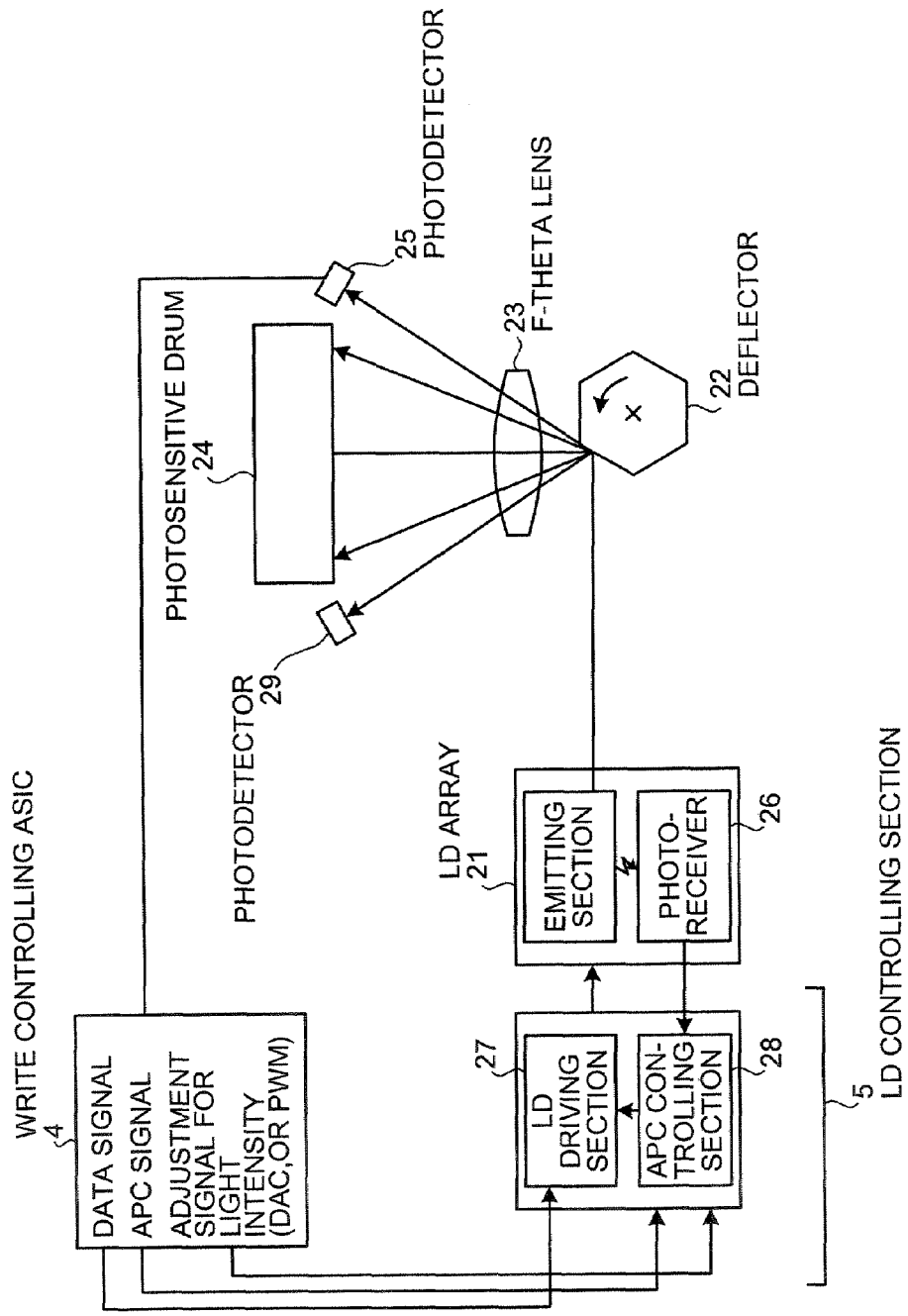
FIG. 2 is a control block diagram of a writing unit of the image forming device shown in FIG. 1.

FIG. 2 is a control block diagram of a writing unit. A laser beam emitted from the LD array 21 is collimated by a collimator lens (not shown), and is incident to a deflector 22 including a rotatable polygon mirror. The laser beam is deflected by the deflector 22, and focused by an f-theta lens 23 onto a surface of a photosensitive drum 24 charged uniformly to a predetermined electric potential by a charger. The focus spot of the laser beam scans along the axial direction of the photosensitive drum 24 repeatedly by rotation of the deflector 22, and the photosensitive drum 24 rotates at the same time. A photodetector 25 is located in the upstream side of a light scanning direction, out of a scanning position on the photosensitive drum 24 outside a data writing area. The photodetector 25 detects the laser beam deflected by the deflector 22 and generates a synchronization detection signal. Writing is performed in the main scanning direction by the movement of the focus spot, and a writing position is shifted in the sub-scanning direction with the rotation of the photosensitive drum 24.

The write controlling ASIC 4 applies an information signal to a LD driving section 27 in the LD controlling section 5 according to synchronization signals from the photodetector 25. The LD driving section 27 drives the LD array 21 according to the information signal from the write controlling ASIC 4 to form an electrostatic latent image on the photosensitive drum 24. The electrostatic latent image is developed by a developing device, and transferred onto a transfer paper by a transferring device. A laser beam emitted backwardly from an emitting section in the LD array 21 is incident to a photoreceiver 26. The photoreceiver 26 detects the light intensity of the laser beam, and transmits a light receiving signal corresponding to the light intensity to an advanced process control (APC) controlling section 28. The APC controlling section 28 controls the LD driving section 27 according to the light receiving signal output from the photoreceiver 26 to maintain the amount of light from light emitting elements in the LD array 21 at a constant level (APC control). Specifically, a driving power source of the light emitting elements in the LD array 21 is adjusted to keep the amount of light output from each light emitting element constant according to each light receiving signal. A photodetector 29 is located in the downstream side of the light scanning direction outside a valid image area, and used in pair with the photodetector 25. The difference in time at which light is incident to the photodetectors 25 and 29 is used to identify and measure errors in the f-theta lens 23. The LD controlling section 5 receives a DATA signal, an APC signal, and a light adjustment signal such as a digital-to-analog conversion (DAC) signal or a pulse width modulation (PWM) signal from the write controlling ASIC 4.

Figure 3:
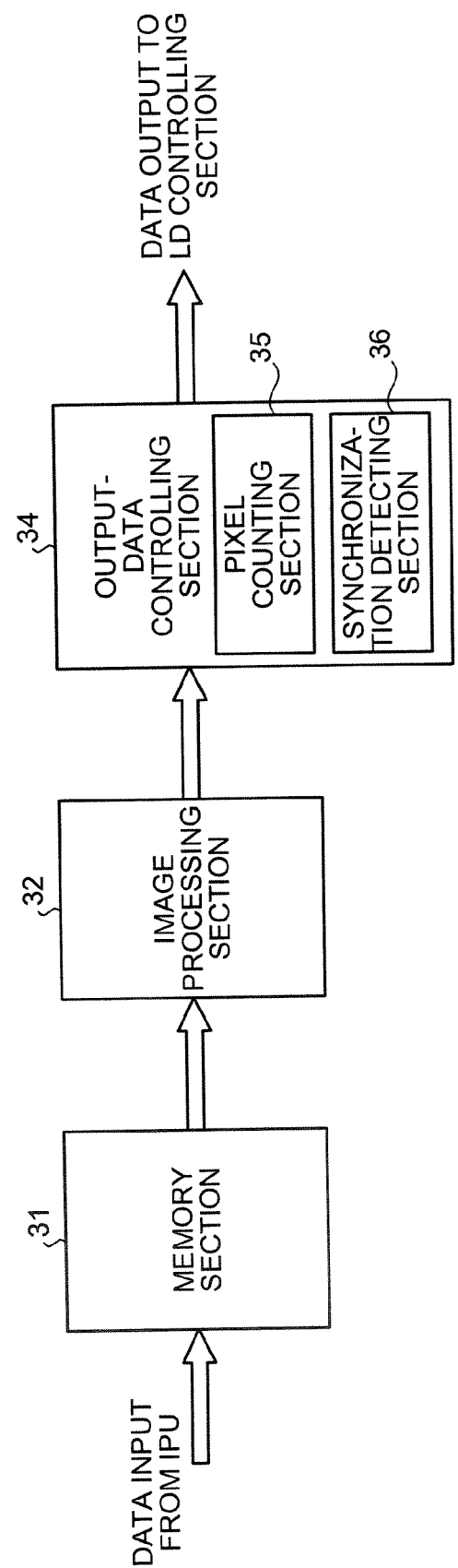
FIG. 3 is a schematic of a write controlling application specific integrated circuit (ASIC) shown in FIG. 1.

FIG. 3 is a schematic of the write controlling ASIC 4. The write controlling ASIC 4 includes a memory section 31, an image processing section 32, and an output data controlling section 34. The output-data controlling section 34 includes a pixel counting section 35 and a synchronization detecting section 36. The synchronization detecting section 36 performs a synchronous detection according to synchronization signals from the photodetectors 25 and 29. The memory section 31 changes a transfer rate and a format of image data received from the IPU 3. The image processing section 32 processes the image data input from the memory section 31. The output-data controlling section 34 performs processes such as gamma conversion and P sensor pattern assignment for the image data from the image processing section 32.

Figure 4:
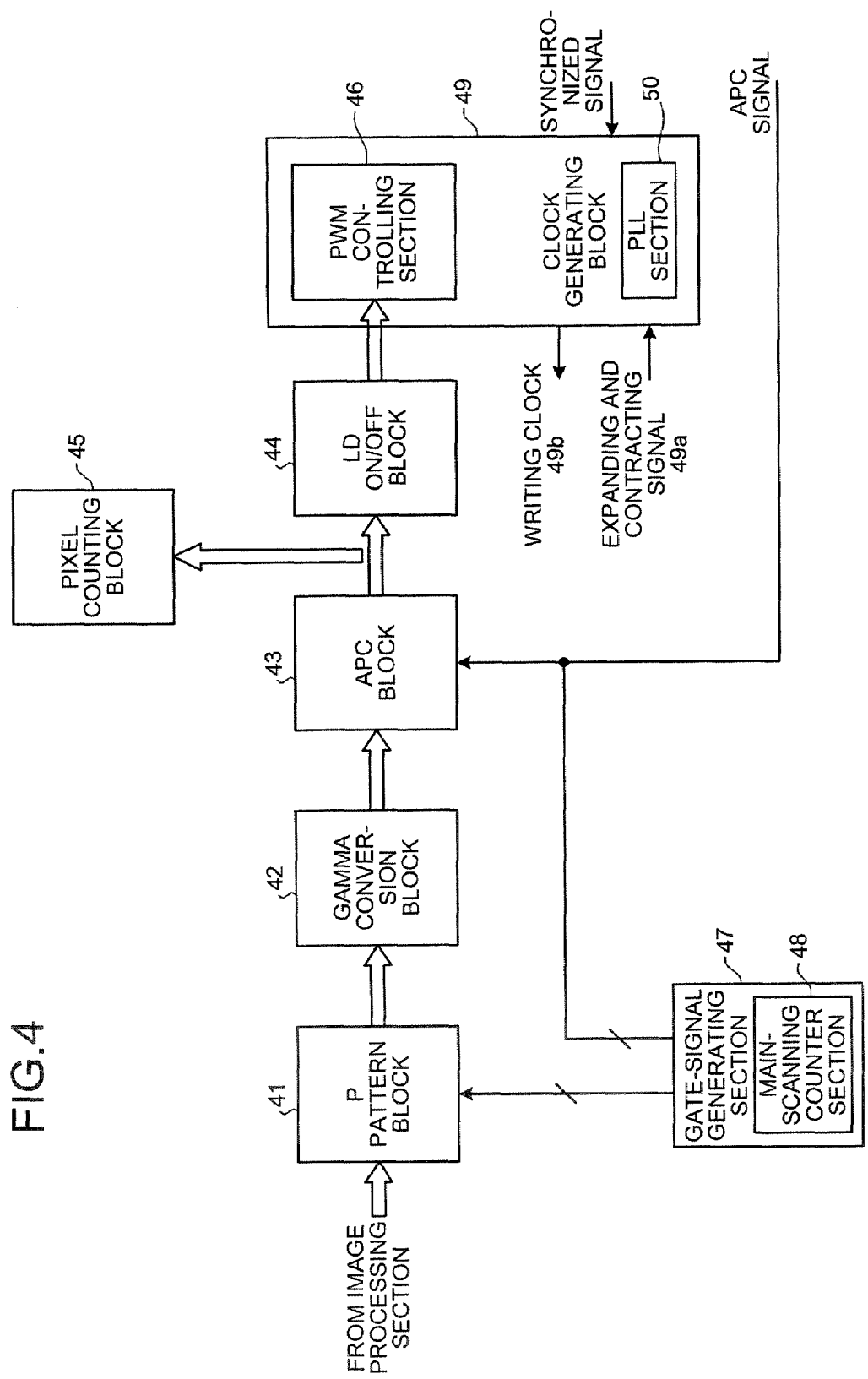
FIG. 4 is an internal block diagram of an output data controlling section in the write controlling ASIC shown in FIG. 3.

FIG. 4 is a detailed block diagram of the output-data controlling section 34 in the write controlling ASIC 4. The output-data controlling section 34 includes a P pattern block 41, a gamma conversion block 42, an APC block 43, a pixel counting block 45, a LD on/off block 44, and a PWM controlling section 46.

The P pattern block 41 forms a toner pattern, so-called P sensor pattern, with a predetermined concentration on the photosensitive drum 24 to obtain data that determines process conditions for data input from the image processing section 32. The gamma conversion block 42 performs gamma conversion for changing the weight of data. The APC block 43 forms an image synchronously with APC operation timing that keeps the amount of light from the LD array 21 constant. The pixel counting block 45 measures the number of light-emitting dots in each LD array 21. The LD on/off block 44 outputs light-emitting data for synchronous detection. The PWM controlling section 46 performs PWM control of the image data.

A gate-signal generating section 47 includes a main-scanning counter section 48, and generates a gate signal necessary for each process by referring to the counter value. A CLK generating block 49 includes the PWM controlling section 46 and a phase-locked loop (PLL) section 50, and changes (expands and contracts) the width of a write CLK 49b according to CLK expanding and contracting data (an expanding and contracting signal 49a) from a write CLK expanding and contracting signal generator (not shown). The main-scanning counter section 48 manages the number of CLKs taken between operations of the photodetectors 25 and 29 outside the valid image area, and outputs information on the number of times to generate the CLK expanding and contracting signal 49a to a controlling section of a main body.

Figure 5:
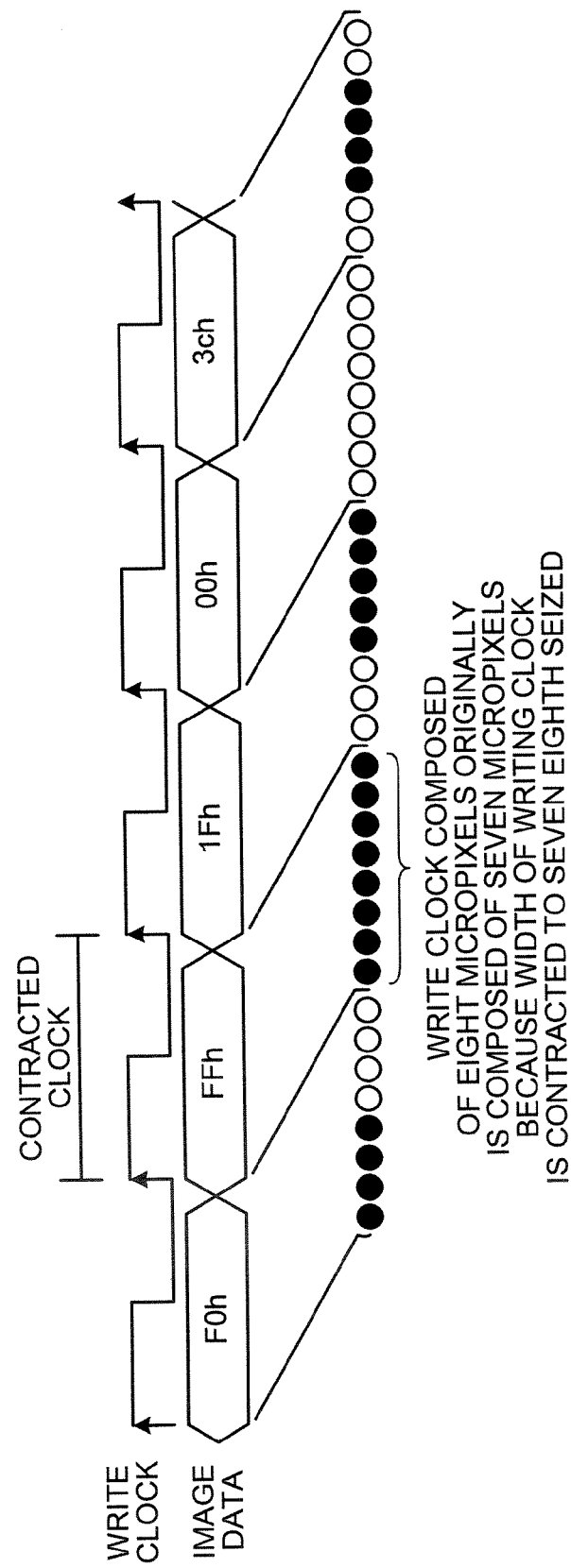
FIG. 5 is a diagram for explaining a conventional correction method.
Figure 6:
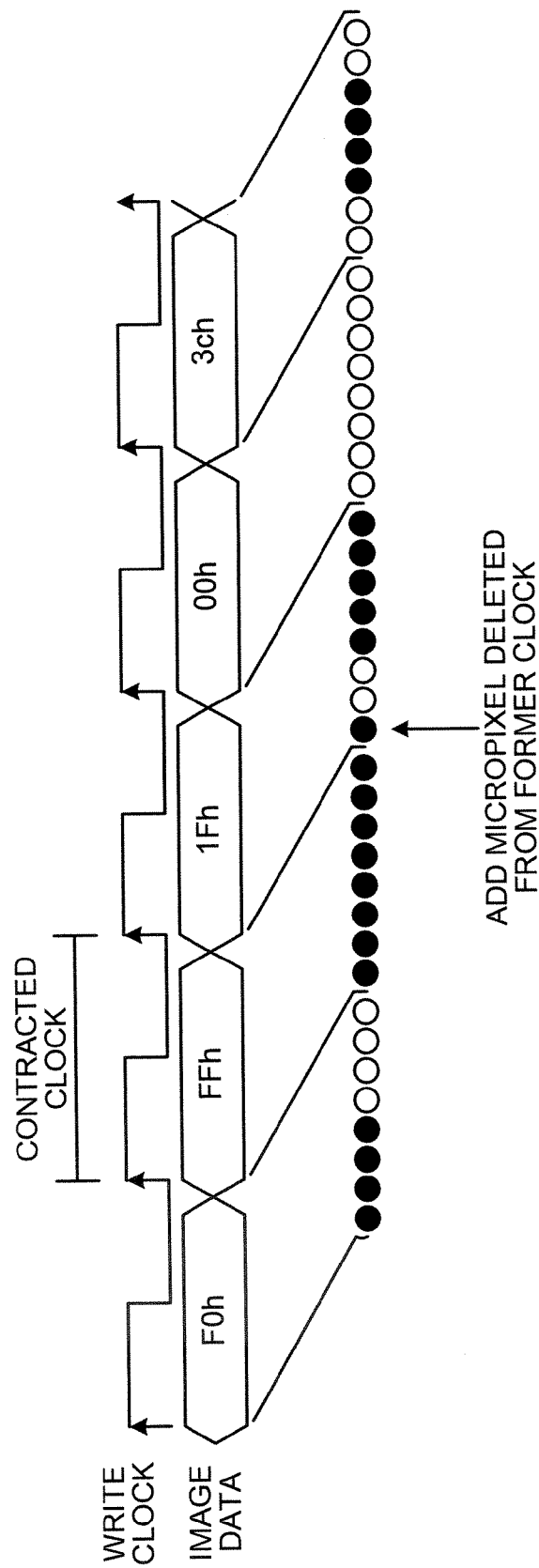
FIG. 6 is a diagram for explaining a correction method according to the embodiment.

FIG. 5 is a diagram for explaining a conventional correction method. FIG. 5 depicts a relation among write CLK, image data, and write pixels. In FIG. 5, the second pixel CLK is contracted, and corresponding image data FFh, which is supposed to consist of eight micropixels, consists of seven micropixels due to the change of the CLK to seven-eighth width. FIG. 6 is a diagram for explaining a correction method according to the embodiment. In FIG. 6, a micropixel that is removed form the second CLK in FIG. 5 is added to the following third CLK.

Namely, in the image data consisting of eight bits, each bit is expressed by a micropixel. The bits are parallel-to-serial converted from the high order bit to form the image data. In the embodiment, image data of the least significant bit, which has been removed from a CLK due to contraction thereof, is reflected in the following CLK. Therefore, as shown in FIG. 6, the most significant bit in the third CLK is replaced by the least significant bit in the second CLK. Thus, image data corresponding to the second CLK consists of seven micropixels, and that corresponding to the third CLK consists of eight micropixels including the last micropixel in the second CLK as the first micropixel followed by original ones of the third CLK.

Figure 7:
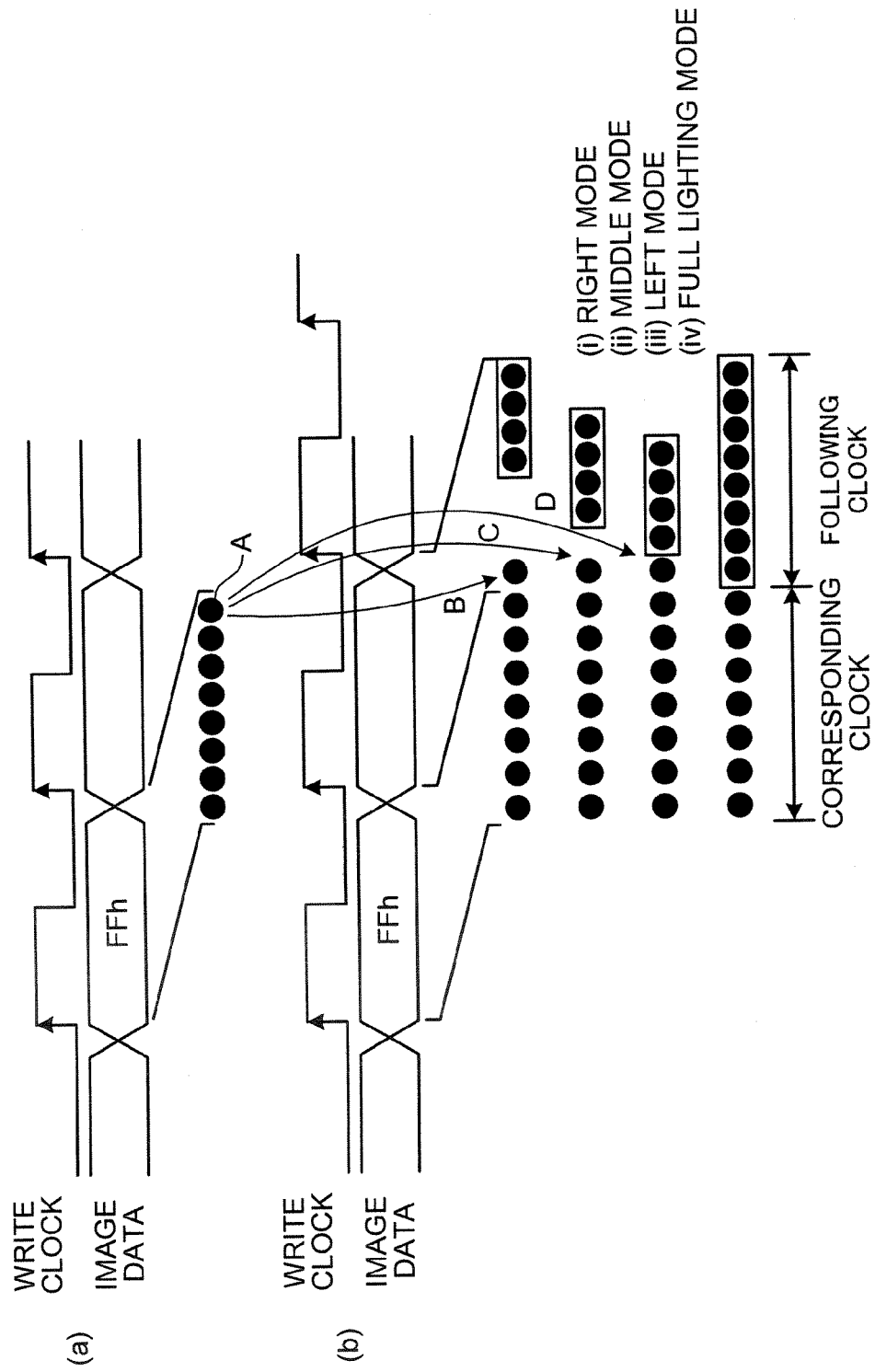
FIG. 7 is a diagram for explaining the correction method when a micropixel is compensated in the following pixels.

With reference to FIG. 7, compensation for a removed micropixel in the following pixels is described below. When the following pixels for a CLK, which originally consists of eight micropixels, are in the right mode (i) or the middle mode (ii), there is a space in an area adjacent to a micropixel A removed from the CLK. Therefore, the removed pixel A is reflected as a pixel B and a pixel C in the top of the following CLK.

When the following pixels are in the left mode (iii), although no space exists in the area adjacent to the micropixel A, there is a space ahead of four micropixels. Therefore, the four micropixels are shifted to make a space for the micropixel A so that the pixel A is reflected as a pixel D in the top of the following CLK.

However, when the following pixels are in the full lighting mode (iv), there is no space in the following CLK. Therefore, even though a micropixel is removed from the CLK, the removed pixel is not reflected in the following CLK.

In the embodiment, correction is performed based on a predetermined judgment as to phase data and concentration data. The correction can be changed according to the operation setting mode called serviceman program (SP) mode that a serviceman sets up.

Besides, in the embodiment, when the following pixels for a CLK, which originally consists of eight micropixels, are in the left mode (iii), the removed micropixel is reflected as the first micropixel in the following CLK. The removed micropixel is not necessarily reflected in the following CLK as in the full lighting mode (iv).

Figure 8:
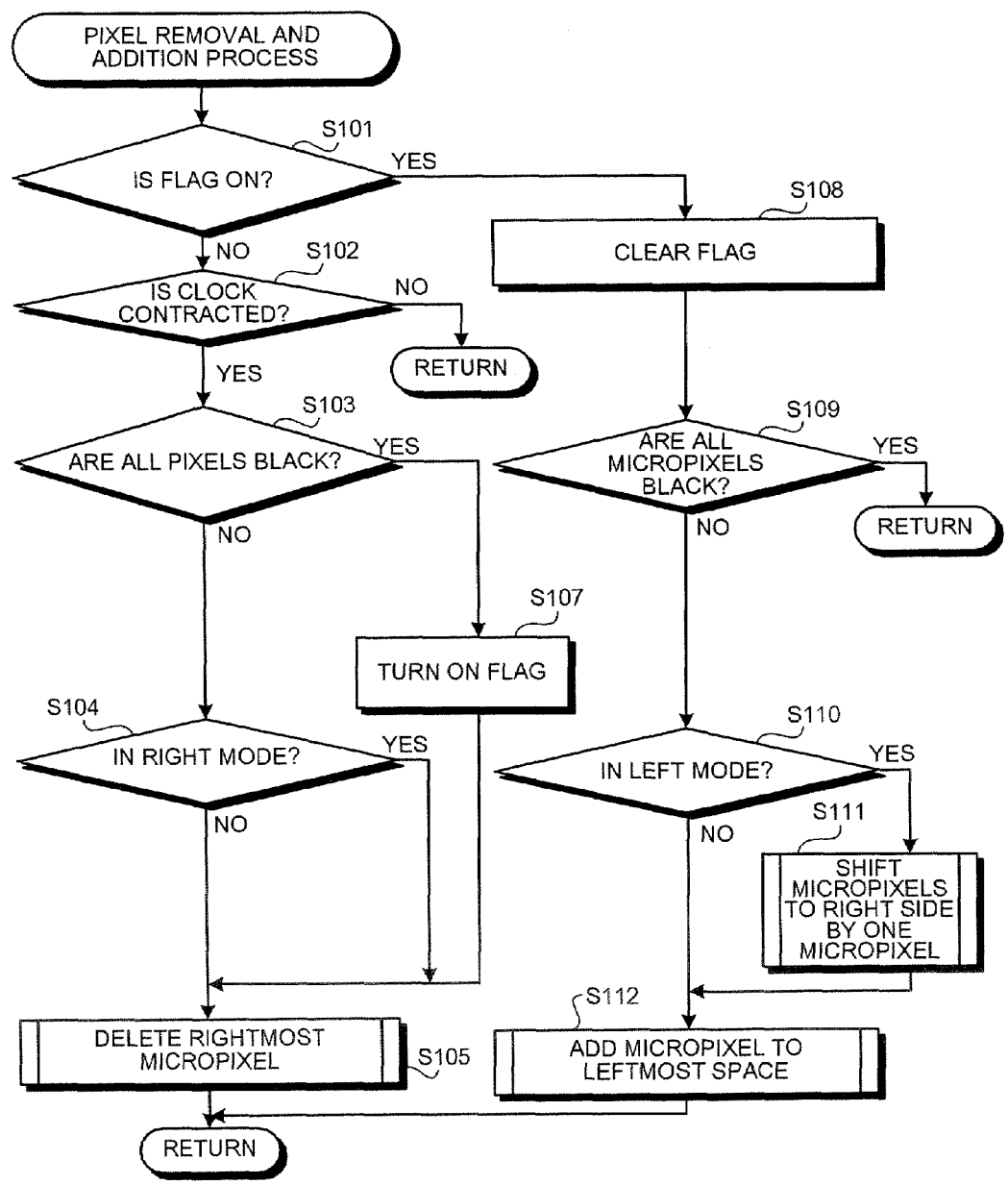
FIG. 8 is a flowchart of pixel removal and addition process.

FIG. 8 is a flowchart for explaining the above operation, namely, a pixel removal and addition process.

First, whether a flag is on is checked (step S101). When the flag is off, pixel addition is not to be performed. Then, whether a CLK is contracted is checked (step S102). When the CLK is not contracted, it is not necessary to perform neither removal nor addition of a pixel, and the process returns to the start. When the CLK is contracted, whether all the following pixels are black is checked (step S103). When there is any pixel that is not black, whether the following pixels are in the right mode is checked (step S104). After that, the micropixel is removed from the CLK (step S105), and then the process returns to the start. When all the following pixels are black at step S103, the flag is turned on (step S107), and the rightmost micropixel is removed (step S106).

On the other hand, when the flag is on at step S101, the flag is cleared (step S108), and then whether all the following pixels are black is checked (step S109). When all the following pixels are black, the process returns to the start. When there is any pixel that is not black, whether the following pixels are in the left mode is checked (step S110). When the following pixels are in the left mode, the following pixels are shifted to right side by one micropixel (step S111), and a micropixel is added to the leftmost space in the next CLK (step S112). When the following pixels are not in the left mode, a micropixel is added to the leftmost space in the next CLK (step S112), and then the process returns to the start.

At step S104, if the following pixels are in the middle mode (ii), the same process is performed as in the right mode (i). Additionally, at step S110, when the following pixels are in the left mode (iii), the process can be returned to the start as in the full lighting mode (iv) without adding the micropixel to the next CLK.

Figure 9:
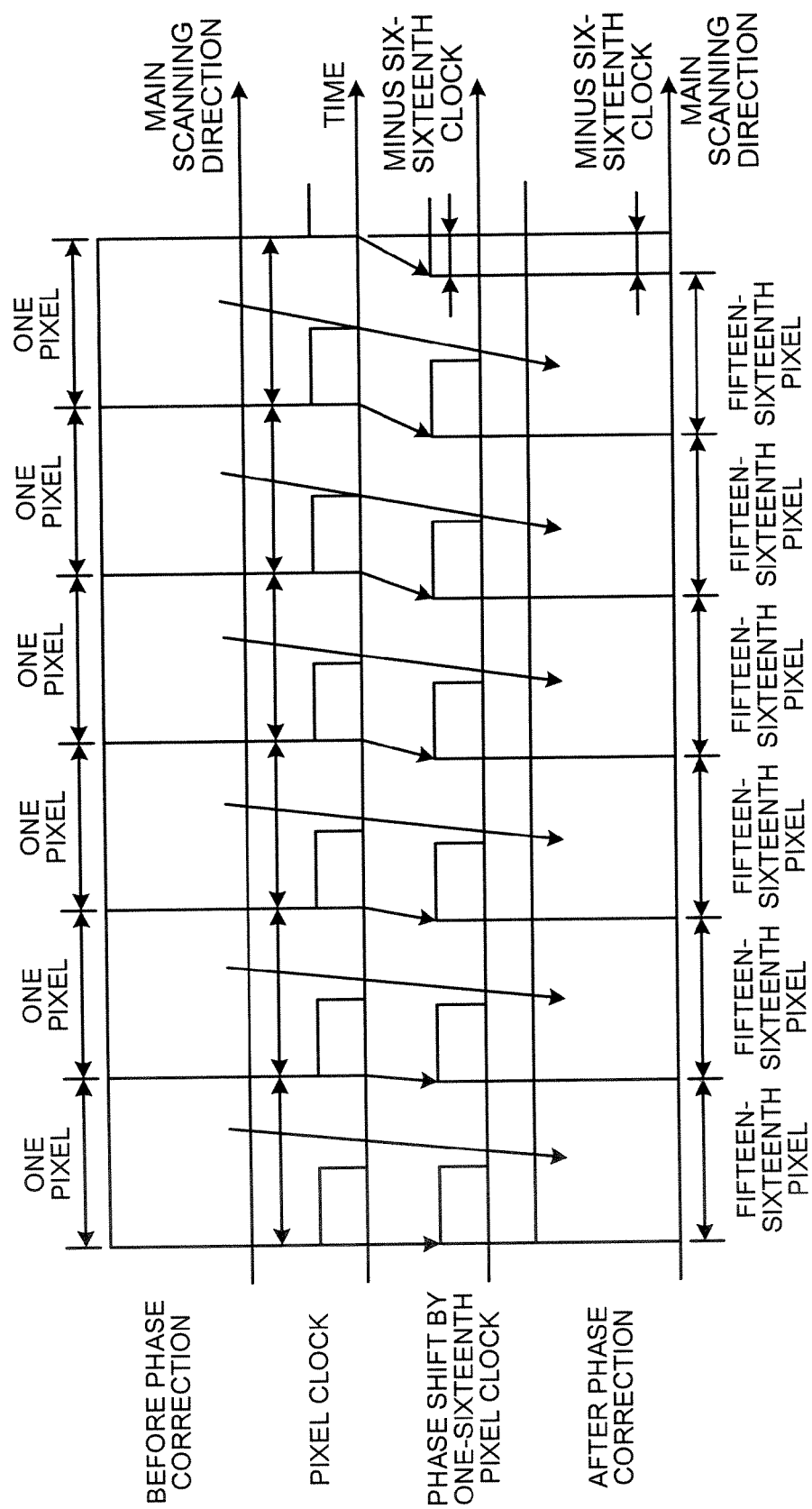
FIG. 9 is a conceptual schematic for explaining CLK modulation as an example of the correction method for a pixel CLK.

FIG. 9 is a conceptual schematic for explaining CLK modulation. FIG. 9 depicts a pixel image before the pixel CLK phase correction, a pixel CLK waveform before the pixel CLK phase correction, the pixel CLK waveform after the pixel CLK phase correction (modulation), and the pixel image after the pixel CLK phase correction (modulation) in descending order. Actually, when a pixel CLK or each pixel does not have same the form, the pixel CLK or the pixel is corrected to have an appropriate pixel CLK cycle or pixel image. However, it is too complicated to explain with reference to a drawing. Thus, in FIG. 9, it is assumed that a pixel CLK before correction (modulation) and a pixel image are equal. When each pixel CLK is modulated by one sixteenth pixel CLK shorter (higher frequency) than a pixel CLK before correction (modulation), each one pixel becomes fifteen sixteenth sized compared with a pixel before correction (modulation) as shown in FIG. 9. When six pixels are sequentially modulated by one sixteenth pixel respectively, a width of writing area becomes shorter by a total of six sixteenth pixel.

Figure 10:
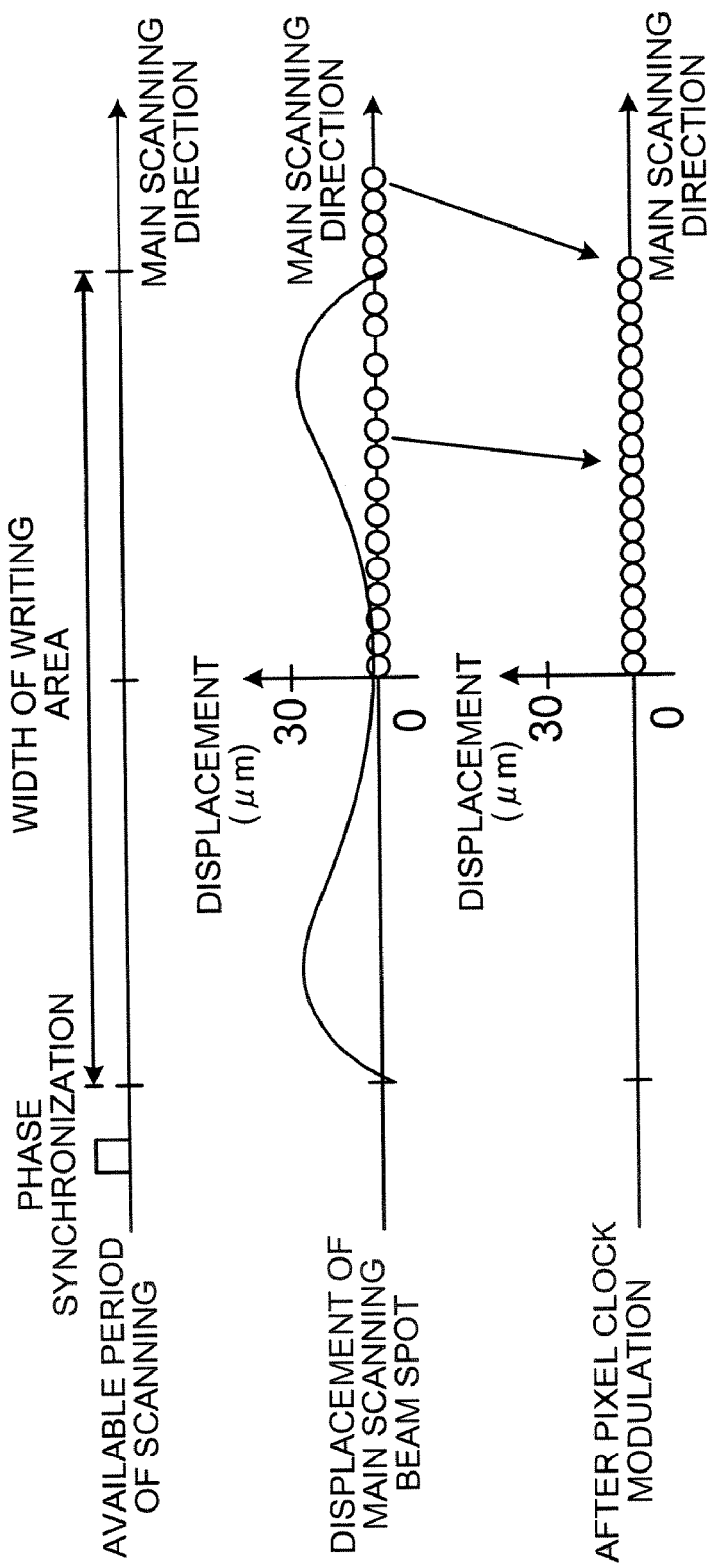
FIG. 10 is a diagram of a pixel image when the pixel CLK is modulated by one line.

FIG. 10 is a diagram of a pixel image when the pixel CLK is modulated by one line. Regarding to the width of writing area that is an available area of scanning, it is assumed that a main scanning beam spot is displaced by the linearity fluctuation of a laser scanning optical system. In this case, spacing between respective pixels represented by circles, which are supposed to be arranged at regular intervals, becomes sparse and condensed, and displacement occurs. However, the uneven pixels can be corrected by the CLK modulation according to the correction data and aligned almost evenly as shown in FIG. 10. When intervals of pixels are not even due to the temperature differences, the uneven pixels can be corrected by the feedback controlling system with a displacement detecting sensor.

Figure 11:
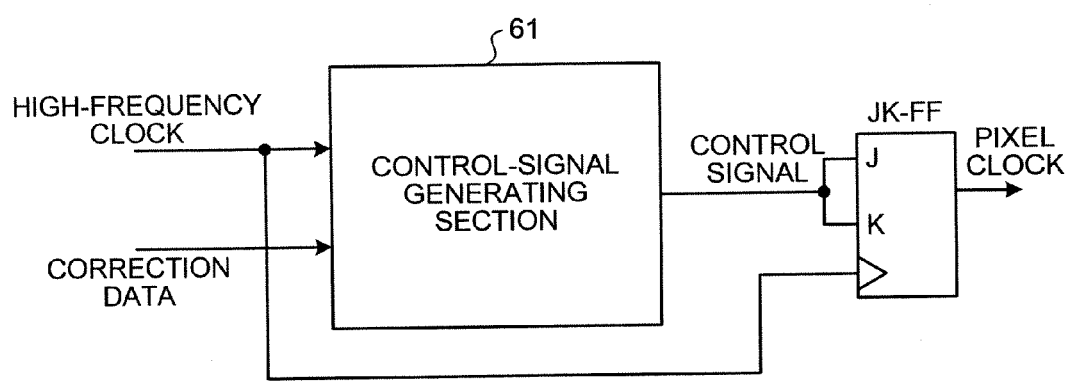
FIG. 11 is a schematic for explaining a generation of a modulated pixel CLK.
Figure 12:
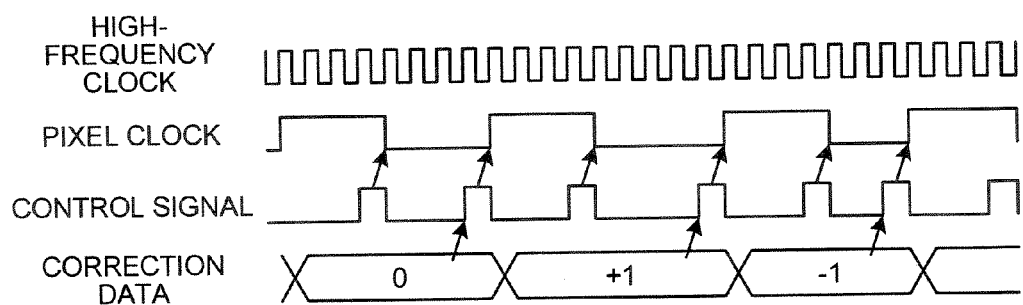
FIG. 12 is a timing chart for explaining timing for the generation of the modulated pixel CLK shown in FIG. 11.

FIG. 11 is a schematic for explaining a generation of a modulated pixel CLK. FIG. 12 is a timing chart for explaining timing for the generation of the modulated pixel CLK shown in FIG. 11. Correction data (modulation data) is input to a control-signal generating section 61 based on the high-frequency CLK and the pixel CLK so that a control signal shown in the timing chart in FIG. 12 is generated. A modulated pixel CLK is generated by the toggle flip flop, for instance, the Jack Knife Flip-Flop (JK-FF) according to the control signal. Each cycle of the pixel CLK can be changed by changing an output timing of the control signal according to the correction data. As shown in FIG. 12, when the correction data is plus one (+1), the cycle of the pixel CLK is expanded (the frequency is decreased). When the correction data is minus one (−1), the cycle of the pixel CLK is contracted (the frequency is increased).

Figure 13:
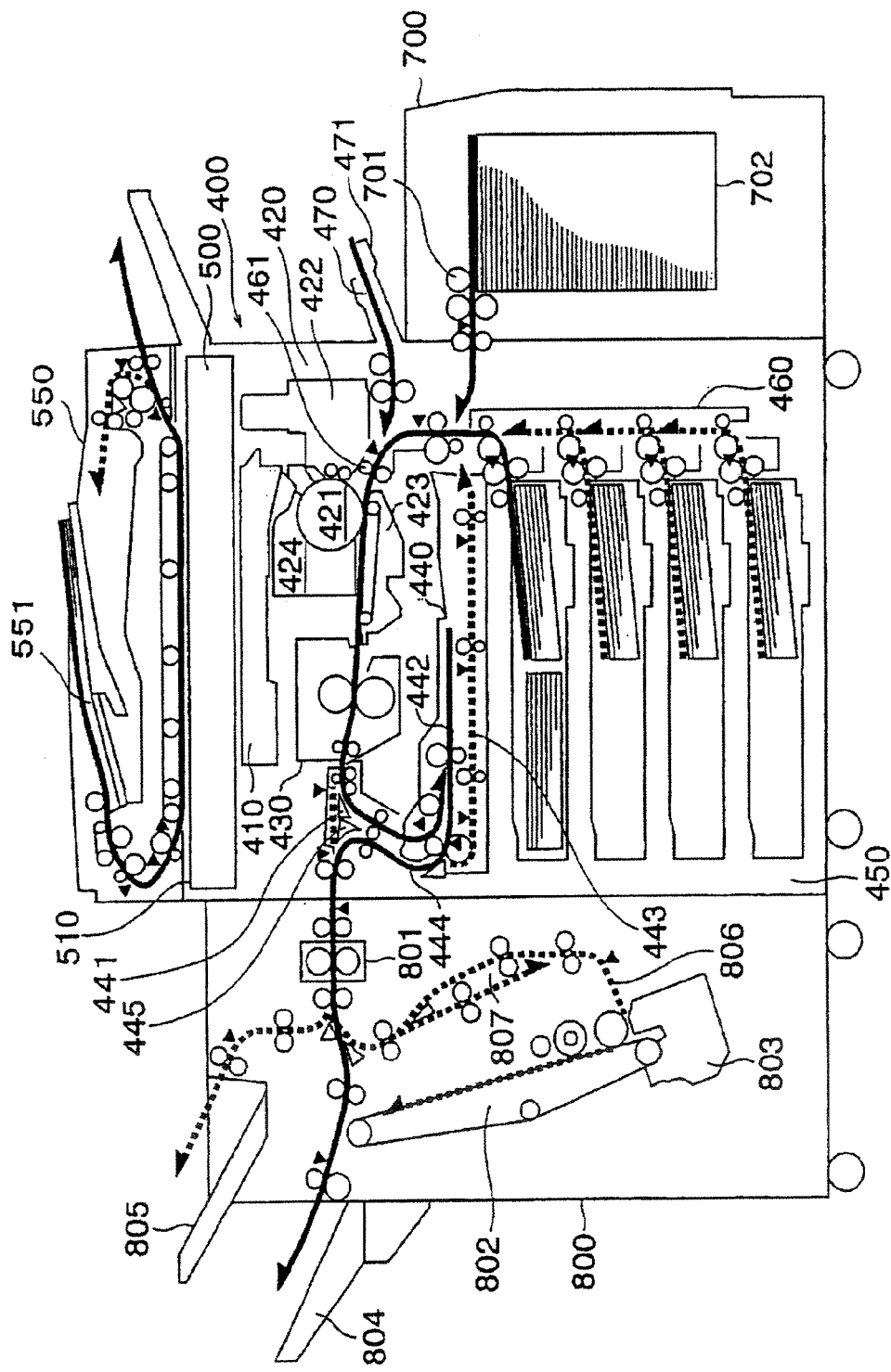
FIG. 13 is a schematic of the digital copier shown in FIG. 1.

FIG. 13 is a schematic of the digital copier 1. The digital copier 1 includes a black-and-white image forming device 400, an image reader 500 (corresponding to the scanner section SC in FIG. 1) that is provided in the upper side of the image forming device 400, an automatic document feeder (ADF) 550 that is mounted on the image reader 500, a high-capacity feeder 700 that is provided to the right side of the image forming device 400, and a paper sheet post-processing device 800 that is provided to the left side of the image forming device 400.

The image forming device 400 includes an image writing section 410 (corresponding to the printer section PR in FIG. 1), an image forming section 420, a fixing section 430, a double-sided conveying section 440, a paper feeding section 450, a vertical conveying section 460, and a manual paper feeding section 470.

The image writing section 410 modulates a LD, which is a source of luminescence, according to image information for the document read in the image reader 500, and performs laser writing on a photosensitive drum 421 by a scanning optical system such as a polygon mirror or an f-theta lens. The image forming section 420 includes the photosensitive drum 421, a developing unit 422 that is provided around outside of the photosensitive drum 421, a transferring unit 423, a cleaning unit 424, and an electricity removing unit that are image forming elements in the well-known electrophotographic system.

The fixing section 430 fixes an image transferred in the transferring unit 423 on a transfer paper. The double-sided conveying section 440 is provided in the downstream side in a conveying direction of the transfer paper fixed in the fixing section 430. The double-sided conveying section 440 includes a first switching claw 441 that switches the conveying direction of the transfer paper to either the paper sheet post-processing device 800 side or the double-sided conveying section 440 side, a reversed conveying path 442 that is led by the first switching claw 441, an image forming side conveying path 443 that conveys the reversed transfer paper to the transferring unit 423 side again, a post-processing side conveying path 444 that conveys the reversed transfer paper to the paper sheet post-processing device 800 side, and a second switching claw 445 that is provided in a fork between the image forming side conveying path 443 and the post-processing side conveying path 444.

The paper feeding section 450 includes four paper feeding trays that store transfer paper. The stored transfer paper is discharged from the paper feeding tray selected by a pick-up roller and a paper feeding roller, and fed into the vertical conveying section 460. The vertical conveying section 460 conveys the transfer paper to a regist roller 461 in the upstream side of the paper conveying direction. The regist roller 461 determines a timing of conveying the transfer paper to be adjusted to the developed image on the photosensitive drum 421 and feeds the transfer paper to the transferring unit 423. The manual paper feeding section 470 includes a manual paper feeding tray 471 that is openable and closable. The manual paper feeding tray 471 is opened and provided the transfer paper by hand therein, if necessary. In this case, the regist roller 461 also determines the timing and conveys the transfer paper.

The high-capacity feeder 700 stocks a large amount of the equal-sized transfer paper and feeds the transfer paper. As the transfer paper is getting decreased, a bottom plate 702 comes up so that a pick-up roller 701 can pick up the transfer paper constantly. The transfer paper picked up by the pick-up roller 701 is conveyed from the vertical conveying section 460 to a nip of the regist roller 461.

The paper sheet post-processing device 800 performs predetermined processing such as punching, aligning, stapling, and sorting of the transfer paper. In the embodiment, the paper sheet post-processing device 800 includes a punch 801, a staple tray (alignment) 802, a stapler 803, and a shift tray 804 for the functions described above. Namely, when the transfer paper conveyed from the image forming device 400 to the paper sheet post-processing device 800 is to be punched, the transfer paper is punched by the punch 801 on a piece of paper basis. When the punched transfer paper is not to be performed any other processing, the punched transfer paper is discharged to a proof tray 805. When the punched transfer paper is to be sorted or stacked, the punched transfer paper is discharged to the shift tray 804. In the embodiment, the transfer paper is fed in a direction perpendicular to the paper conveying direction by the shift tray 804 repeatedly so that a predetermined amount of the transfer paper is stacked. Or, the transfer paper is shifted in a direction perpendicular to the paper conveying direction in the paper conveying path and stacked thereon.

When the transfer paper is to be aligned, the transfer paper that is either punched or not punched is led to a downward conveying path 806, and aligned in a direction perpendicular to the paper conveying direction by a back-end fence of the staple tray 802, and further aligned in a direction parallel to the paper conveying direction by a jogger fence of the staple tray 802. Furthermore, when the transfer paper is to be bound, a stack of the aligned transfer paper is bound in, for instance, one predetermined position in a corner portion or two predetermined positions in a center portion by the stapler 803, and then discharged to the shift tray 804 by a release belt. In the embodiment, the downward conveying path 806 includes a prestack conveying path 807 that stacks a plurality of the transfer paper during conveying so as to prevent from interrupting the image forming (post-processing) operation in the image forming device 400.

The image reader 500 optically scans the document, which is led by the ADF 550 and stopped on a contact glass 510, and reads an image of the document, which is provided by an imaging lens via a first or a third mirror, with a photoelectric conversion element such as a charge coupled device (CCD) or a complementary metal oxide semiconductor (CMOS). The read image data is subjected to a predetermined image processing in an image processing circuit (not shown), and stored in a storage unit. The image data is read from the storage unit by the image writing section 410 when the image is formed, and modulated according to the image data so as to perform the optical writing.

The ADF 550 is mounted openably and closably on an installation surface of the contact glass 510 in the image reader 500, and reads both sides of the document. In the ADF 550, when the document put on a document table 551 is to be read, the document is automatically conveyed on the contact glass 510.

As described above, according to an embodiment of the present invention, when an image is contracted according to change in write CLK, a removed micropixel is added to image data corresponding to the following CLK. Thus, the concentration information is not changed, which eliminates an adverse effect on an output image.

Moreover, the following CLK (following image) correction is performed based on phase information or concentration information for the following image. Thus, an effect on the following image caused by the addition of a micropixel can be minimized.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device comprising:
    a scanning unit that scans an optical beam in a main scanning direction while shifting a scanning position in a sub-scanning direction by a predetermined pitch to write pixels on a recording medium;
    a clock frequency changing unit that changes a frequency of a first write clock for writing data by the scanning unit from a first frequency to a second frequency at a position in the main scanning direction;
    an image data processing unit that processes first image data to be written to the position according to the second frequency thereby obtaining second image data; and
    a correcting unit that adds, when a pixel is removed from the first image data when obtaining the second image data in the image data processing unit, removed pixel to pixels corresponding to a second write clock that follows the first write clock.

2. The optical writing device according to claim 1, further comprising:
    a reference position detecting unit that detects a reference position to start writing in the main scanning direction, and generates a detection signal; and
    a write starting position determining unit that determines a write starting position in the main scanning direction based on the detection signal.

3. The optical writing device according to claim 1, wherein the correcting unit compensates for the removed pixel in the second write clock based on phase information for third image data corresponding to the second write clock.

4. The optical writing device according to claim 1, wherein the correcting unit compensates for the removed pixel in the second write clock based on concentration information for third image data corresponding to the second write clock.

5. The optical writing device according to claim 1, further comprising:
    a determining unit that determines, when pixel addition setting is off, whether the first write clock has been contracted; and
    a pixel checking unit that checks, when the first write clock has been contracted, whether the pixels corresponding to the second write clock are all black, wherein
    the correcting unit removes, when there is a pixel that is not black, a rightmost pixel from pixels corresponding to the first write clock.

6. The optical writing device according to claim 1, further comprising:
    a determining unit that determines, when pixel addition setting is off, whether the first write clock has been contracted; and
    a pixel checking unit that checks, when the first write clock has been contracted, whether the pixels corresponding to the second write clock are all black, wherein
    the correcting unit turns on, when all the pixels are black, the pixel addition setting, and removes a rightmost pixel from pixels corresponding to the first write clock.

7. The optical writing device according to claim 1, further comprising:
    a pixel checking unit that checks, when pixel addition setting is on, whether the pixels corresponding to the second write clock are all black, and when there is a pixel that is not black, checks whether black pixels are located in a left side of a writing area in the second write clock, wherein
    the correcting unit adds, when the black pixels are not located in the left side of the writing area, a pixel to a leftmost side of the writing area in the second write clock.

8. The optical writing device according to claim 7, wherein the correcting unit shifts, when the black pixels are located in the left side of the writing area, the black pixels to right by one pixel space, and adds a pixel to the leftmost side of the writing area.

9. The optical writing device according to claim 1, wherein the clock frequency changing unit includes a pulse-width modulation controlling unit and a phase-locked loop unit, and changes a width of the write clock frequency based on a write clock frequency change signal.

10. The optical writing device according to claim 9, further comprising a number setting unit that sets number of times to change frequencies of write clocks.

11. The optical writing device according to claim 10, further comprising:
a reference position detecting unit that detects a reference position to start writing in the main scanning direction; and
a position detecting unit that is located outside a writing area on a downstream side of the main scanning direction, wherein
the number setting unit determines number of frequencies of write clocks to be changed based on number of clock frequencies required to scan an area from the reference position detecting unit to the position detecting unit.

12. An image forming device comprising an optical writing device that scans an optical beam in a main scanning direction while shifting a scanning position in a sub-scanning direction by a predetermined pitch to write pixels on a recording medium, wherein
the optical writing device includes:
a clock frequency changing unit that changes a frequency of a first write clock for writing data by the scanning unit from a first frequency to a second frequency at a position in the main scanning direction;
an image data processing unit that processes first image data to be written to the position according to the second frequency thereby obtaining second image data; and
a correcting unit that adds, when a pixel is removed from the first image data when obtaining the second image data in the image data processing unit, removed pixel to pixels corresponding to a second write clock that follows the first write clock.

13. An optical writing method, comprising:
scanning an optical beam in a main scanning direction while shifting a scanning position in a sub-scanning direction by a predetermined pitch to write pixels on a recording medium;
detecting a reference position to start writing in the main scanning direction to generate a detection signal;
determining a write starting position in the main scanning direction based on the detection signal;
changing a frequency of a first write clock for writing data from a first frequency to a second frequency at a position in an area scanned from the write starting position in the main scanning direction; and
adding, when a pixel is removed from the first image data, removed pixel to pixels corresponding to a second write clock that follows the first write clock.

14. The optical writing method according to claim 13, further comprising compensating for the removed pixel in the second write clock based on phase information for second image data corresponding to the second write clock.

15. The optical writing method according to claim 13, further comprising compensating for the removed pixel in the second write clock based on concentration information for second image data corresponding to the second write clock.

16. The optical writing method according to claim 13, further comprising:
determining, when pixel addition setting is off, whether the first write clock has been contracted;
checking, when the first write clock has been contracted, whether the pixels corresponding to the second write clock are all black; and
removing, when there is a pixel that is not black, a rightmost pixel from pixels corresponding to the first write clock.

17. The optical writing method according to claim 13, further comprising:
determining, when pixel addition setting is off, whether the first write clock has been contracted;
checking, when the first write clock has been contracted, whether the pixels corresponding to the second write clock are all black;
turning the pixel addition setting on when all the pixels are black; and
removing a rightmost pixel from pixels corresponding to the first write clock.

18. The optical writing method according to claim 13, further comprising:
checking, when pixel addition setting is on, whether the pixels corresponding to the second write clock are all black;
checking, when there is a pixel that is not black, whether black pixels are located in a left side of a writing area in the second write clock;
adding, when the black pixels are not located in the left side of the writing area, a pixel to a leftmost side of the writing area in the second write clock;
shifting, when the black pixels are located in the left side of the writing area, the black pixels to right by one pixel space to adds a pixel to the leftmost side of the writing area.

19. An optical writing device comprising:
scanning means for scanning an optical beam in a main scanning direction while shifting a scanning position in a sub-scanning direction by a predetermined pitch to write pixels on a recording medium;
clock frequency changing means for changing a frequency of a first write clock for writing data by the scanning means from a first frequency to a second frequency at a position in the main scanning direction;
image data processing means for processing first image data to be written to the position according to the second frequency thereby obtaining second image data; and
correcting means for adding, when a pixel is removed from the first image data when obtaining the second image data in the image data processing means, removed pixel to pixels corresponding to a second write clock that follows the first write clock.

* * * * *